United States Patent
Kim (10) Patent No.: US 10,030,337 B2
(45) Date of Patent: Jul. 24, 2018

(54) MULTIFUNCTIONAL SYNTHETIC RESIN BLOCK FOR ROAD

(71) Applicant: Yongho Kim, Seoul (KR)

(72) Inventor: Yongho Kim, Seoul (KR)

( * ) Notice: Subject to any disclaimer, the term of this patent is extended or adjusted under 35 U.S.C. 154(b) by 0 days.

(21) Appl. No.: 15/478,045

(22) Filed: Apr. 3, 2017

(65) Prior Publication Data

US 2017/0292227 A1   Oct. 12, 2017

(30) Foreign Application Priority Data

Apr. 11, 2016 (KR) .................. 10-2016-0044042

(51) Int. Cl.
*E01C 5/22* (2006.01)

(52) U.S. Cl.
CPC ............ *E01C 5/22* (2013.01); *E01C 2201/16* (2013.01); *E01C 2201/207* (2013.01)

(58) Field of Classification Search
CPC ... E01C 5/001; E01C 5/20; E01C 5/22; E01C 5/223
USPC ............................................. 404/31, 41, 44
See application file for complete search history.

(56) References Cited

U.S. PATENT DOCUMENTS

| | | | | |
|---|---|---|---|---|
| 1,560,174 A | * | 11/1925 | Gaisman ................ | E01O 5/226 404/33 |
| 1,885,720 A | * | 11/1932 | Hewett ................ | B28B 7/0044 404/44 |
| 2,680,698 A | * | 6/1954 | Schnee ................ | E04F 15/10 15/215 |
| 3,765,136 A | * | 10/1973 | Mudd ................ | E04F 19/10 404/20 |
| 4,129,917 A | * | 12/1978 | Sivachenko ............ | E01D 2/04 14/6 |
| 4,220,423 A | * | 9/1980 | Sivachenko ............ | E04B 7/08 405/272 |
| 4,291,510 A | * | 9/1981 | Sivachenko ............ | E04D 3/30 52/22 |

(Continued)

FOREIGN PATENT DOCUMENTS

| | | | | |
|---|---|---|---|---|
| EP | 0524680 A1 | * | 1/1993 | ............ E01C 5/06 |
| GB | 2463680 A | * | 3/2010 | ............ E01C 5/20 |

(Continued)

*Primary Examiner* — Thomas B Will
*Assistant Examiner* — Katherine J Chu
(74) *Attorney, Agent, or Firm* — Korus Patent, LLC; Seong Il Jeong (57) ABSTRACT

A multifunctional synthetic resin block for roads. The synthetic resin block includes a water permeable sheet configured as a synthetic resin block having a flat sheet shape so as to be laid on a ground, a block frame configured as a synthetic resin body taking a form of a rectangular frame, which is divided into multiple rectangular areas each having open top and bottom sides, so as to be installed on the upper surface of the water permeable sheet, the rectangular areas being filled with filler stones, and multiple corrugated plates each configured as a synthetic resin having a rectangular plate shape and arranged so that corrugations thereof are oriented perpendicular to each other so as to cover the rectangular areas of the block frame. The synthetic resin block provides almost all functions, such as a rainwater retention function, water permeation function, and anti-slippage function, at low cost.

6 Claims, 7 Drawing Sheets

(56) References Cited

U.S. PATENT DOCUMENTS

| | | | | |
|---|---|---|---|---|
| 5,250,340 | A * | 10/1993 | Bohnhoff | E01C 9/004 428/99 |
| 5,323,575 | A * | 6/1994 | Yeh | E04F 21/1844 52/177 |
| 5,480,254 | A * | 1/1996 | Autry | E03F 5/0401 210/163 |
| D442,704 | S * | 5/2001 | Lee | E01C 9/004 D25/118 |
| 6,319,300 | B1 * | 11/2001 | Chen | B01D 46/0001 55/385.3 |
| 6,428,870 | B1 * | 8/2002 | Bohnhoff | E02B 11/00 405/50 |
| 6,779,946 | B1 * | 8/2004 | Urriola | E01C 9/004 405/43 |
| 7,000,884 | B2 * | 2/2006 | Bucknell | E01C 9/001 249/2 |
| 7,686,540 | B2 * | 3/2010 | Urriola | E01C 11/225 405/43 |
| 7,848,475 | B2 * | 12/2010 | Kaufman | B01D 39/10 210/346 |
| 8,282,310 | B2 * | 10/2012 | White | E01C 3/06 404/18 |
| 9,802,717 | B2 * | 10/2017 | Valentini | B64F 1/025 |
| 9,869,090 | B2 * | 1/2018 | Wilson | E01F 5/005 |
| 9,909,264 | B1 * | 3/2018 | Stiles | E01C 17/00 |
| 2006/0285920 | A1 * | 12/2006 | Gettig | E01C 13/045 404/31 |
| 2007/0269265 | A1 * | 11/2007 | Thorkelson | E01O 5/18 404/34 |
| 2009/0136297 | A1 * | 5/2009 | Ferraiolo | E02B 3/127 405/19 |
| 2009/0266022 | A1 * | 10/2009 | Lin | E04F 15/10 52/506.1 |
| 2011/0052318 | A1 * | 3/2011 | Smith | E01O 5/18 404/73 |
| 2013/0276399 | A1 * | 10/2013 | Rapaz | E04O 2/34 52/592.1 |
| 2015/0117949 | A1 * | 4/2015 | Battersby | E01C 11/00 404/29 |
| 2015/0265491 | A1 * | 9/2015 | Henshue | A61H 3/066 404/19 |

FOREIGN PATENT DOCUMENTS

| | | |
|---|---|---|
| JP | 2015-017374 A | 1/2015 |
| JP | 2016-501995 A | 1/2016 |
| KR | 10-2009-0052644 A | 5/2009 |
| KR | 10-2014-0104759 A | 8/2014 |

* cited by examiner

MULTIFUNCTIONAL SYNTHETIC RESIN BLOCK FOR ROAD

BACKGROUND OF THE INVENTION

Field of the Invention

The present invention relates to blocks for roads and, more particularly, to synthetic resin blocks providing various functions.

Description of the Related Art

Although urban roads and highways are usually paved in asphalt or concrete, roads with a low traffic volume, sidewalks, parking lots, walkways, and bicycle-only roads may be paved in natural stone materials such as, for example, gravel or crushed stones, in order to reduce road paving costs and harmonize with the surrounding landscape. In such paved roads of conventional natural stone materials, for example, gravel or crushed stones may be piled up or broken by contact with vehicles or pedestrians, and dirt may be jammed and stuck between gravel and crushed stones, which may make it difficult for the roads to continuously maintain consistent performance due to, for example, reduced water permeability.

Examples of functional blocks for roads, developed or commercialized to date, may include a water permeable functional block, which provides efficient water permeation to prevent various accidents caused by the formation of a water film on the road surface, a rainwater retention functional block, which contains rainwater therein to reduce the temperature of the road surface and prevent a heat island phenomenon, and a vegetation functional block, which allows plants to grow therein in order to harmonize with the surrounding landscape. Conventional functional blocks disclosed in, for example, Korean Patent Registrations No. 10-1510731 and No. 10-0500575 are cement blocks that provide the above-described functions via a combination of special materials. Since the use of special materials increases manufacturing costs and requires a large amount of manufacturing facilities such as, for example, a molding facility, a stirring facility, and a curing facility, these conventional functional blocks have a problem in that the manufacturing cost thereof is very high.

Accordingly, the conventional functional blocks are not suitable for use on roads where road pavement costs need to be reduced, for example, streets, sidewalks, parking lots, walkways, and bicycle-only roads. Moreover, the conventional functional blocks are mainly made of materials that have low corrosion resistance and low abrasion resistance such as, for example, cement and aggregate, and need to be replaced regularly. Since the replacement of the conventional functional blocks requires the removal of all existing blocks and paving with new blocks, the maintenance/repair work for the conventional functional blocks is very cumbersome and very costly. Synthetic resin materials have high corrosion resistance and high abrasion resistance, but are expensive and lightweight compared to, for example, cement and aggregate, and thus are not suitable for materials of blocks for roads.

SUMMARY OF THE INVENTION

Therefore, the present invention has been made in view of the above problems, and it is an object of the present invention to provide a multifunctional synthetic resin block for roads, which may provide almost all functions required in blocks for roads such as, for example, a rainwater retention function, a water permeation function, and an anti-slippage function, at low cost, which may have sufficient strength to withstand the weight of vehicles, and which may continuously maintain consistent performance, thereby ensuring easy maintenance/repair work with low maintenance/repair work costs. The present invention is not limited to the above-described technical object, and other technical objects may be derived from the following description.

In accordance with the present invention, the above and other objects can be accomplished by the provision of a multifunctional synthetic resin block for roads, including a water permeable sheet configured as a synthetic resin block taking a form of a flat sheet to enable permeation of water through pores in a predetermined pattern, the water permeable sheet being laid on a ground, a block frame configured as a synthetic resin body taking a form of a rectangular frame, which is divided by at least one longitudinal partition and at least one transverse partition so as to have a plurality of rectangular areas each having open top and bottom sides, the block frame being installed on an upper surface of the water permeable sheet, a plurality of filler stones having irregular shapes so that each filler stone has a larger particle size than a size of any pore in the water permeable sheet, the rectangular areas of the block frame being filled with the filler stones, and a plurality of corrugated plates each configured as a synthetic resin body taking a form of a rectangular plate having a transverse cross section in which "V"-shaped convex and concave portions are successively and alternately repeated, the corrugated plates being arranged so that corrugations thereof are oriented perpendicular to each other, thereby covering the respective rectangular areas of the block frame, which are filled with the filler stones.

Each corrugated plate has a plurality of drain holes formed in respective valleys of the concave portions thereof in a longitudinal direction of the valleys so that rainwater that falls onto the corrugated plate is introduced into the drain holes along "V"-shaped slopes on an upper surface of the corrugated plate. Some of the rainwater that has passed through the drain holes in each corrugated plate is stored in a void that has a closed bottom side, among voids between the filler stones, and the remaining rainwater passes through a void that has open top and bottom sides, among the voids between the filler stones, and the water permeable sheet to thereby be discharged into the ground.

One of two neighboring corrugated plates, among the corrugated plates, may be engaged with upper ends of two sidewalls that are opposite each other in a longitudinal direction of one rectangular area among two neighboring rectangular areas of the block frame so that corrugations thereof are oriented in a transverse direction, thereby covering the corresponding rectangular area, and a remaining one of the two neighboring corrugated plates may be engaged with upper ends of two sidewalls that are opposite each other in a transverse direction of a remaining rectangular area among the two neighboring rectangular areas so that corrugations thereof are oriented in the longitudinal direction, thereby covering the remaining rectangular area.

Among four sidewalls of the one rectangular area, the two sidewalls that are opposite each other in the longitudinal direction may have the corrugated upper ends so as to be engaged with a corrugated lower surface of the corresponding corrugated plate and one of two sidewalls that are opposite each other in the transverse direction has a flat upper end, whereby the corrugated plate is engaged with the upper ends of the two sidewalls that are opposite each other in the longitudinal direction of the corresponding rectangular area so that corrugations thereof are oriented in the transverse direction, thereby covering the corresponding rectangular area, and, among four sidewalls of the remaining rectangular area, the two sidewalls that are opposite each other in the transverse direction may have the corrugated upper ends so as to be engaged with a corrugated lower surface of the corresponding corrugated plate and one of two sidewalls that are opposite each other in the longitudinal direction has a flat upper end, whereby the remaining corrugated plate is engaged with the upper ends of the two sidewalls that are opposite each other in the transverse direction of the corresponding rectangular area, thereby covering the corresponding rectangular area.

The block frame may be a synthetic resin body taking a form of a rectangular frame, which is divided by one longitudinal partition and one transverse partition so as to have four rectangular areas each having open top and bottom sides. An upper end of each of four sidewalls of the rectangular frame may be provided with a pair including a corrugated portion and a flat portion so that pairs of corrugated and flat portions are alternately repeated in a clockwise direction or in a counterclockwise direction along an upper end periphery of the rectangular frame. Each of four outer surfaces of the rectangular frame may be provided with a pair including a protrusion and a retention hole so that pairs of protrusions and retention holes are alternately repeated in the clockwise direction or in the counterclockwise direction along an outer periphery of the rectangular frame so as to be caught by and coupled with each other. One pair including the protrusion and the retention hole on one outer surface of the block frame may be caught by and coupled with one pair including the protrusion and the retention hole on one outer surface of another block frame, which has the same shape as the block frame, whereby, when the block frame and the other block frame are connected to each other, two corrugated plates, which cover neighboring rectangular areas of the block frame and the other block frame, are configured such that corrugations thereof are oriented perpendicular to each other.

The block frame may include a rectangular frame having open top and bottom sides, a linear longitudinal partition configured to divide an inner space of the rectangular frame in a longitudinal direction, a linear transverse partition configured to divide the inner space of the rectangular frame in a transverse direction, and a plurality of "X"-shaped area partitions each configured to divide a corresponding rectangular area of the rectangular frame into "X"-shaped areas, and wherein each corrugated plate may cover a corresponding rectangular area of the rectangular frame so as to be seated on an upper end of a corresponding "X"-shaped area partition in the corresponding rectangular area of the rectangular frame.

The synthetic resin block may further include a plurality of screws, each of which passes through a screw hole in a corresponding corrugated plate and is tightened into and coupled to a center wall body of a corresponding "X"-shaped area partition in a corresponding rectangular area of the rectangular frame, so as to couple the corrugated plate to the "X"-shaped area partition in the rectangular area of the rectangular frame. The center wall body of the "X"-shaped area partition may be provided with a vertical passage, a top of which is closed by a film that is thinner than a corresponding corrugated plate, and each screw may be pushed to penetrate the film on the top of the center wall body, and thereafter may be tightened with screw-threads formed in the vertical passage to thereby be coupled thereto.

BRIEF DESCRIPTION OF THE DRAWINGS

The above and other objects, features and other advantages of the present invention will be more clearly understood from the following detailed description taken in conjunction with the accompanying drawings, in which:

FIG. 3(a) is a perspective view.

DETAILED DESCRIPTION OF THE INVENTION

Hereinafter, exemplary embodiments of the present invention will be described in detail with reference to the accompanying drawings. The embodiments of the present invention, which will be described below, relate to a multifunctional synthetic resin block for roads, which may provide almost all functions required in blocks for roads such as, for example, a rainwater retention function, a water permeation function, and an anti-slippage function, at low cost, which may have sufficient strength to withstand the weight of vehicles, and which may continuously maintain consistent performance, thereby ensuring easy maintenance/repair work with low maintenance/repair work costs. Hereinafter, the multifunctional synthetic resin block for roads may be briefly referred to as "synthetic resin block".

Figure 1:
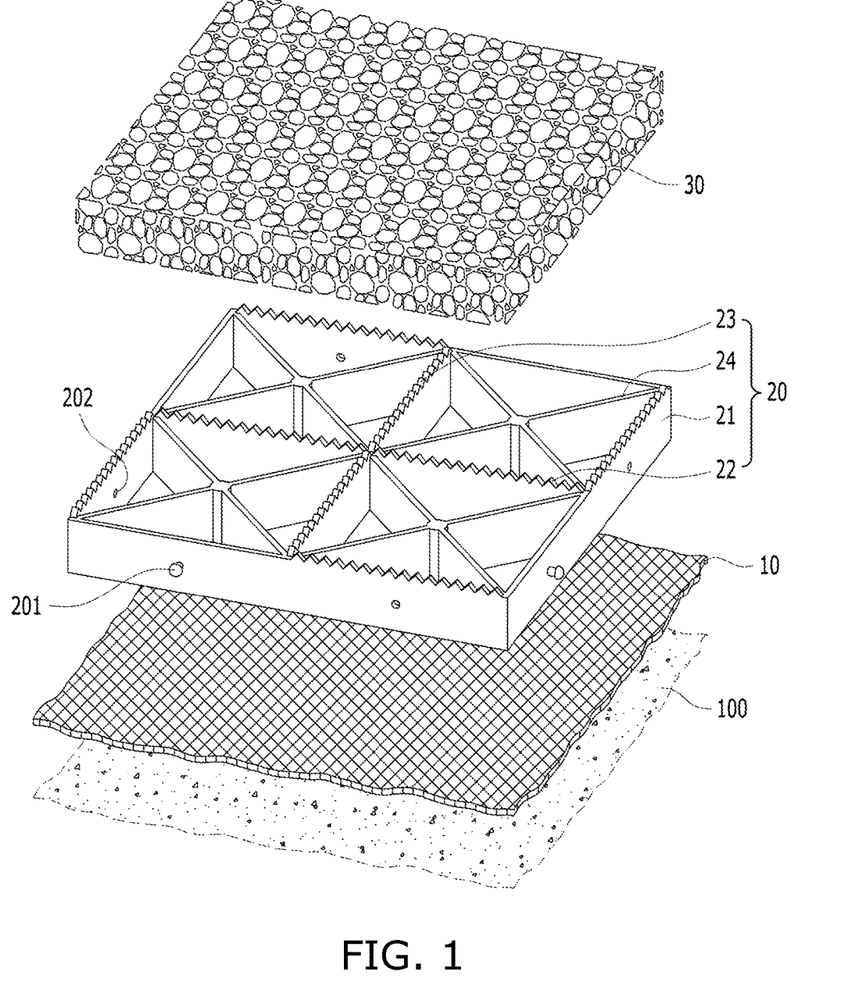
FIGS. 1 and 2 are exploded perspective views illustrating a synthetic resin block according to an embodiment of the present invention.
Figure 2:
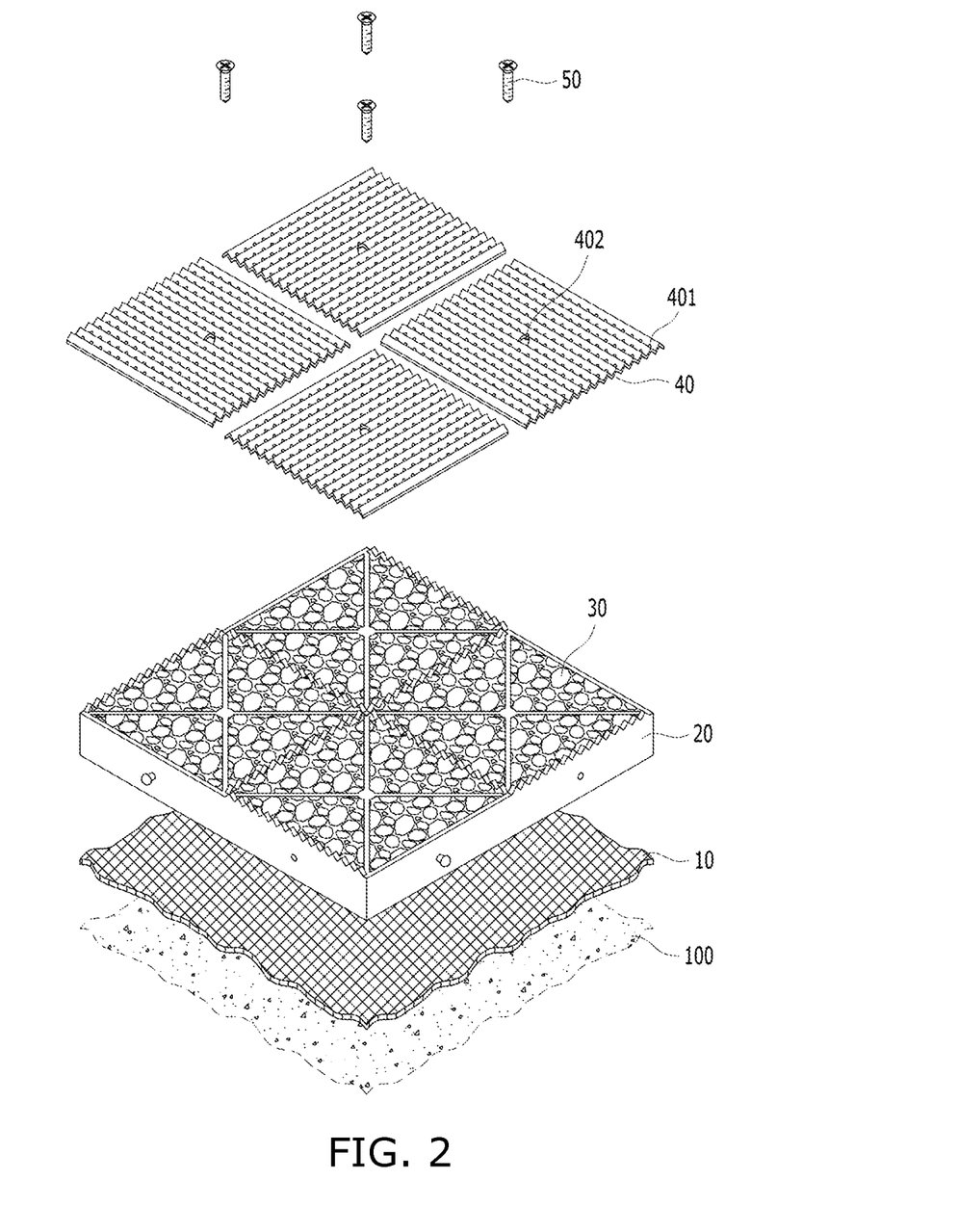
Figure 3A:
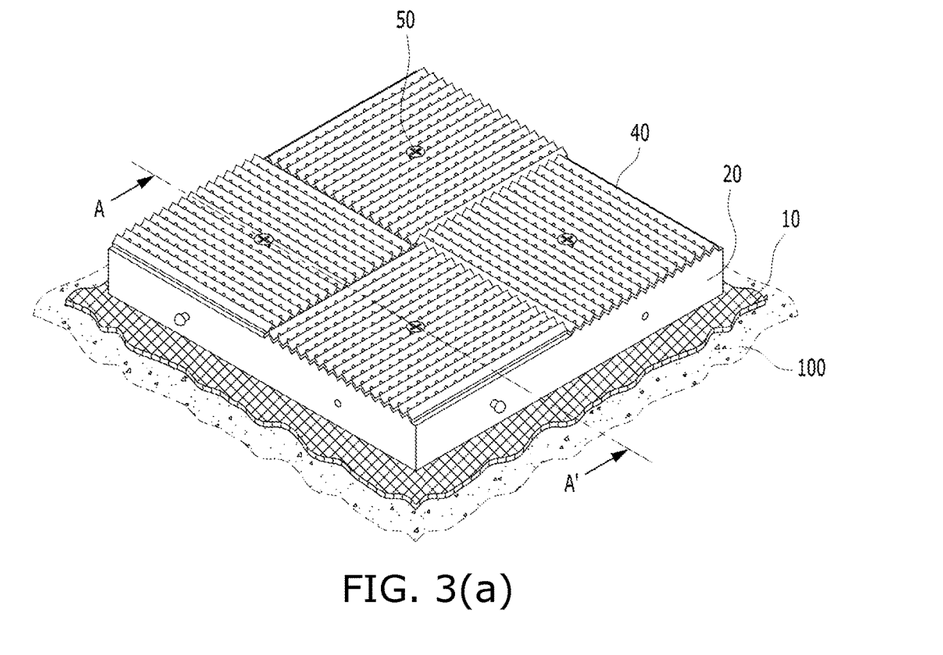
Figure 3B:
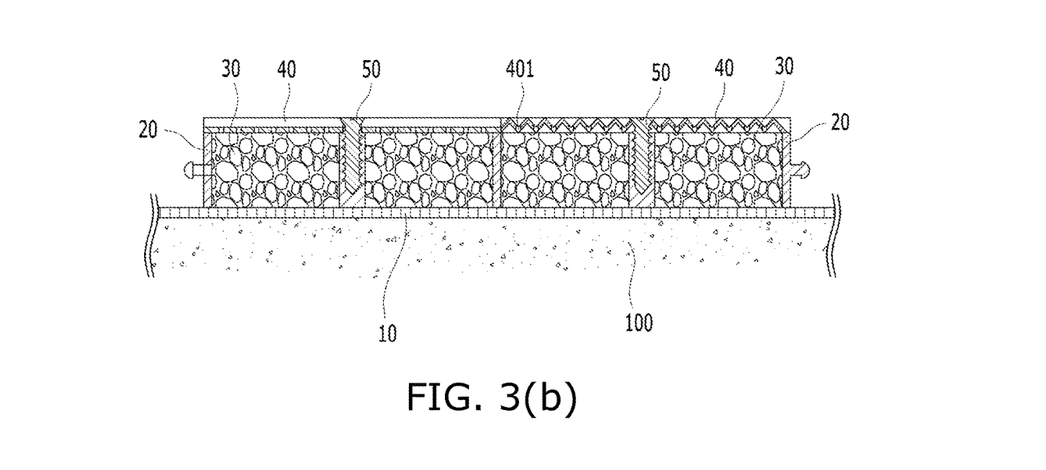
FIG. 3(b) is a vertical cross-sectional view, illustrating the completely assembled state of the synthetic resin block illustrated in FIGS. 1 and 2.

FIGS. 1 and 2 are exploded perspective views illustrating a synthetic resin block according to an embodiment of the present invention, and FIGS. 3(a) and 3(b) are perspective views illustrating the completely assembled state of the synthetic resin block illustrated in FIGS. 1 and 2. Referring to FIGS. 1 to 3(b), the synthetic resin block according to the present embodiment includes a water permeable sheet 10, a block frame 20, a plurality of filler stones 30, a plurality of corrugated plates 40, and a plurality of screws 50. In order to assist the understanding of the process of assembling the synthetic resin block for roads according to the present embodiment, FIG. 1 illustrates the state before the block frame 20 is filled with the filler stones 30 in an exploded perspective view, and FIG. 2 illustrates the state in which the block frame 20 is filled with the filler stones 30 in an exploded perspective view. FIG. 3(a) illustrates a perspective view of the multifunctional synthetic resin block for roads, and FIG. 3(b) illustrates a vertical cross-sectional view of the multifunctional synthetic resin block for roads.

The water permeable sheet 10 is a synthetic resin body taking the form of a flat sheet, which enables the permeation of water through pores in a predetermined pattern. The water permeable sheet 10 is laid on the ground 100. After foreign substances such as, for example, the roots of trees and rocks, are removed from the ground 100, flattening work to flatten and harden the ground 100 is performed, and the water permeable sheet 10 is laid on the flattened and hardened ground 100. Since the individual pores in the water permeable sheet 10 have a smaller size than the particle size of the smallest filler stone 30, among the filler stones 30 filled in the block frame 20, no filler stone 30 may pass through any of the pores in the water permeable sheet 10. The water permeable sheet 10 serves to allow rainwater that has passed through the filler stones 30 to be smoothly introduced into the ground 100 and to prevent the filler stones 30 from being press-fitted into the ground 100. The water permeable sheet 10 is manufactured to a larger size than the size of a road to be constructed on the ground 100 so that several block frames 20 are placed on the water permeable sheet 10. Examples of the water permeable sheet 10 may include a synthetic resin non-woven fabric or mesh.

The block frame 20 is a synthetic resin body taking the form of a rectangular frame 21, which is divided by at least one longitudinal partition 22 and at least one transverse partition 23 so as to have a plurality of rectangular areas each having open top and bottom sides. The block frame 22 is installed on the upper surface of the water permeable sheet 10. The block frame 20 serves to define the form of a rectangular block for roads by gathering the filler stones 30 therein. Although the block frame 20 may be manufactured using polycarbonate, fiber reinforced plastic (FRP), or the like, the block frame 20 may be manufactured using high density polyethylene (HDPE), which is environmentally friendly because no environmentally hazardous hormones are emitted therefrom, and which has excellent durability and heat resistance. Accordingly, since the synthetic resin block according to the present embodiment may be manufactured using an environmentally friendly material, the synthetic resin block may be used in, for example, roads, sidewalks, parking lots, walkways, and bicycle-only roads of suburban districts where ecosystem protection is required.

Among two neighboring rectangular areas of the block frame 20, any one rectangular area is configured such that, among four sidewalls thereof, two sidewalls that are opposite each other in the longitudinal direction respectively have corrugated upper ends so as to be engaged with the corrugated lower surface of each corrugated plate 40 and any one of the remaining two sidewalls that are opposite each other in the transverse direction has a flat upper end. Among the two neighboring rectangular areas of the block frame 20, the other rectangular area is configured such that, among four sidewalls thereof, two sidewalls that are opposite each other in the transverse direction respectively have corrugated upper ends so as to be engaged with the corrugated lower surface of each corrugated plate 40 and any one of the remaining two sidewalls that are opposite each other in the longitudinal direction has a flat upper end.

The block frame 20 is a synthetic resin body in which the rectangular frame 21 having open top and bottom sides, the at least one linear longitudinal partition 22 configured to divide the inner space of the rectangular frame 21 in the longitudinal direction, the at least one linear transverse partition 23 configured to divide the inner space of the rectangular frame 21 in the transverse direction, and a plurality of "X"-shaped area partitions 24, each of which divides each rectangular area of the rectangular frame 21 into "X"-shaped areas, are integrally formed with one another. The longitudinal partition 22 is formed into a rectangular plate shape so that opposite ends thereof are bonded to two inner surfaces that are opposite each other in the longitudinal direction, among four inner surfaces of the rectangular frame 21. The transverse partition 23 is formed into a rectangular plate shape so that opposite ends thereof are bonded to two inner surfaces that are opposite each other in the transverse direction, among the four inner surfaces of the rectangular frame 21. Each of the area partitions 24 is shaped in such a manner that two rectangular plates cross each other to have an "X"-shaped form. As such, four ends of the area partition 24 are bonded to four corners of each rectangular area of the rectangular frame 21.

According to the embodiment illustrated in FIGS. 1 to 3(b), the block frame 20 is a synthetic resin body taking the form of the rectangular frame 21, which is divided by one longitudinal partition 22 and one transverse partition 23 so as have four rectangular areas each having open top and bottom sides. Among the four rectangular areas of the block frame 20, an upper right-hand rectangular area is configured such that, among four sidewalls thereof, two sidewalls that are opposite each other in the longitudinal direction respectively have corrugated upper ends so as to be engaged with the corrugated lower surface of each corrugated plate 40 and an upper sidewall of the remaining two sidewalls that are opposite each other in the transverse direction has a flat upper end. An upper left-hand rectangular area of the block frame 20 is configured such that, among four sidewalls thereof, two sidewalls that are opposite each other in the transverse direction respectively have corrugated upper ends so as to be engaged with the corrugated lower surface of each corrugated plate 40 and a left sidewall of the remaining two sidewalls that are opposite each other in the longitudinal direction has a flat upper end.

A lower left-hand rectangular area of the block frame 20 is configured such that, among four sidewalls thereof, two sidewalls that are opposite each other in the longitudinal direction respectively have corrugated upper ends so as to be engaged with the corrugated lower surface of each corrugated plate 40 and a lower sidewall of the remaining two sidewalls that are opposite each other in the transverse direction has a flat upper end. A lower right-hand rectangular area of the block frame 20 is configured such that, among four sidewalls thereof, two sidewalls that are opposite each other in the transverse direction respectively have corrugated upper ends so as to be engaged with the corrugated lower surface of each corrugated plate 40 and a right sidewall of the remaining two sidewalls that are opposite each other in the longitudinal direction has a flat upper end. In any one rectangular area of the block frame 20, the sidewall that is opposite the sidewall having the flat upper end in the longitudinal direction or the transverse direction is provided with the corrugated upper end, which may be engaged with the corrugated lower surface of each corrugated plate 40 in cooperation with the corrugated portion of the rectangular area that is next to the corresponding rectangular area.

The filler stones 30 have irregular shapes so that each has a larger particle size than the size of each pore in the water permeable sheet 10, and the rectangular areas of the block frame 20 are filled with the filler stones 30. When the block frame 20 is full of the filler stones 30, the filler stones 30 serve to maintain the form of the rectangular block for roads, and to store some of the rainwater introduced therein while discharging the remaining rainwater into the ground 100. Each of the filler stones 30 may be manufactured by crushing natural stones such as, for example, granite into a particle size that is greater than the size of each pore in the water permeable sheet 10 and allows the filler stones 30 to be piled up in several layers so that the block frame 20 is filled with the filler stones 30. In the process of crushing the natural stones, the respective filler stones 30 attain irregular shapes. For example, when the height of the block frame 20 is 50 mm, the respective filler stones 30 may be manufactured to a particle size within a range from 10 mm to 20 mm. Otherwise, natural stones that fulfill the above-described condition may be collected and directly used as the filler stones 30.

In order to simply and rapidly construct the synthetic resin block according to the present embodiment, each rectangular area of the block frame 20 is filled with the filler stones 30 by pouring a pile of the filler stones 30 illustrated in FIG. 1 into the block frame 20. When the filler stones 30 having irregular shapes are disposed in a disorderly manner in the block frame 20 so that the block frame 20 is filled with the filler stones 30, voids between the filler stones 30 filled in the block frame 20 may have various shapes and each void may have a closed top side, a closed bottom side, or open top and bottom sides.

Some of the rainwater that has passed through a plurality of drain holes 401 in each corrugated plate 40 is stored in the voids that have the closed bottom side, among the voids between the filler stones 30, and the remaining rainwater passes through the voids that have the open top and bottom sides, among the voids between the filler stones 30, and the water permeable sheet 10 to thereby be discharged into the ground 100. When the rainwater is introduced into the voids that have the closed bottom side, among the voids between the filler stones 30 filled in the block frame 20, the rainwater is stored for a long time until it is dried in the voids. When the surface of the synthetic resin block according to the present embodiment is heated by sunlight in the summer, the temperature of the surface of the synthetic resin block is reduced by the evaporation of moisture in the voids between the filler stones 30.

Thereby, the present embodiment may provide a block for roads having a water retention function, which may considerably alleviate the discomfort of pedestrians caused by an increase in the temperature of the road surface and may prevent an urban heat island phenomenon. Since the synthetic resin block having this water retention function may be manufactured by pouring a pile of filler stones, which are acquired by crushing natural stones that may be easily collected in nature, into the block frame 20 without requiring manufacturing facilities for general blocks for roads such as, for example, a molding facility, a stirring facility, and a curing facility, the block for roads having the water retention function may be provided at very low cost. In addition, since the corrugated plate 40, which forms the surface of the synthetic resin block according to the present embodiment, is a synthetic resin body having very low thermal conductivity, the effects described above may be further increased.

Korean Patent Registration No. 10-1510731 discloses a polymer cement mortar composition having a water retention function, which includes a water retention emulsion including polyacryl acid, sodium polyacrylate, acrylamide, sulfonic acid, ethyl-methacrylate, and methyl-butyl nitrile within a range of 0.01~15 wt %, an inorganic-based binder within a range of 10~60 wt %, fine aggregate within a range of 10~70 wt %, and water within a range of 0.1~15 wt %, and a method of manufacturing a water retention block using the same. Most conventional water retention cement blocks including the water retention block disclosed in this patent are configured such that rainwater is stored in the matrix of a constituent material, and undergo cracking of a cement block when the water stored in the cement block freezes in the winter.

The synthetic resin block according to the present embodiment is configured such that, among the voids between the filler stones 30 filled in the block frame 20, rainwater is stored in the voids having the closed bottom side. When the rainwater in the voids freezes, thus increasing in volume, the filler stones 30 may be slightly moved and relocated by variation in the volume of the material in the voids, thereby being capable of accommodating variation in the volume of the material in the voids. Thereby, the synthetic resin block according to the present embodiment does not crack due to freezing and melting in the winter. In this way, the present embodiment may provide a block for roads, which is resistant to freezing and melting in the winter.

When the rainwater is introduced into the voids that have the open top and bottom sides, among the voids between the filler stones 30 filled in the block frame 20, the rainwater is discharged into the ground 100 through the voids. Accordingly, it is possible to prevent the rainwater from overflowing the surface of the synthetic resin block according to the present embodiment during rainfall, and the moisture on the surface of the synthetic resin block may be directly removed simultaneously with the end of rainfall. In this way, the present embodiment may provide a block for roads, which has a function capable of preventing, for example, car accidents and pedestrian accidents due to moisture on the road surface. In addition, since the corrugated plates 40, which form the surface of the synthetic resin block according to the present embodiment, are arranged so that corrugations thereof are oriented perpendicular to each other, slippage of the corrugates plates 40 upon contact with the road surface may be considerably reduced.

Korean Patent Registration No. 10-0500575 discloses a method of manufacturing a natural stone made water permeable flat plate block in which a mixture of natural stone aggregate of 80 wt %, water of 4.5 wt %, water permeable cement of 15.33 wt %, and cellulose of 0.17 wt % forms an upper layer of the block and a mixture of crushed stones of 80 wt %, water of 4.5 wt %, water permeable cement of 15.33 wt %, and cellulose of 0.17 wt % forms a lower layer of the block, and a natural stone water permeable flat plate block manufactured from the same. Most conventional water permeable cement blocks including the water permeable block disclosed in this patent are configured such that water is discharged through fine voids in the inner matrix of the constituent materials thereof, and have a problem in that these voids may be easily clogged by nonpoint pollutants on the road surface.

The synthetic resin block according to the present embodiment is configured such that water drains through the voids that have the open top and bottom sides, among the voids between the filler stones 30 filled in the block frame 20. Since the respective voids are much larger than fine voids in the inner matrix of conventional water permeable cement blocks, the voids are not easily clogged by nonpoint pollutants on the road surface. In addition, since the voids between the filler stones 30 have irregular sizes, even if some of the voids that have a small size are clogged by nonpoint pollutants on the road surface, the case where all of the voids are clogged almost never occurs.

Accordingly, the present embodiment may provide the block for roads, which is substantially not affected by the amount of rainfall and the nonpoint pollutants on the road surface and continuously maintains an excellent water permeation function. Since the synthetic resin block having this water permeation function may be manufactured by pouring a pile of filler stones, which are acquired by crushing natural stones that may be easily collected in nature, into the block frame 20 without requiring manufacturing facilities for general blocks for roads such as, for example, a molding facility, a stirring facility, and a curing facility, the block for roads having the water permeation function may be provided at very low cost.

Each of the corrugated plates 40 is a synthetic resin body that takes the form of a rectangular plate having a transverse cross section in which "V"-shaped convex and concave portions are successively and alternately repeated. The corrugated plates 40 are arranged so that corrugations thereof are oriented perpendicular to each other, thereby covering the respective rectangular areas in the block frame 20, which are filled with the filler stones 30. The corrugated plates 40 form the road surface and also cover the open upper surface of the block frame 20 to prevent leakage of the filler stones 30 from the block frame 20 and damage to the filler stones 30 and also to prevent pollutants from being jammed between the filler stones 30, thereby serving to maintain consistent performance of the synthetic resin block according to the present embodiment.

The filler stones 30 filled in the block frame 20 occupy most of the volume of the synthetic resin block, and have, for example, a water retention function and a water permeation function, which are important functions of the synthetic resin block. Accordingly, in the case where the filler stones 30 filled in the block frame 20 become lost or damaged, or pollutants are jammed therebetween, the performance of the synthetic resin block is deteriorated. In the same manner as the block frame 20, although the corrugated plates 40 may be manufactured using, for example, polycarbonate or FRP, the corrugated plates 40 may be manufactured using HDPE. In order to harmonize with the surrounding landscape, the corrugated plates 40 may be manufactured using a transparent synthetic resin material so that the filler stones 30 below the corrugated plates 40 are visible.

Since the lower ends of the respective concave portions of each corrugated plate 40 come into contact with the filler stones 30 filled in the block frame 20, the corrugated transverse cross section of each corrugated plate 40 described above forms a truss structure in which triangular frameworks are successively arranged in a single plane. The filler stones 30 filled in the block frame 20 are not in a fixed state, and therefore may not completely serve as a lower chord of the truss structure. As illustrated in FIGS. 2 and 3, each corrugated plate 40 covers each rectangular area of the rectangular frame 21 so as to be seated on the upper end of the "X"-shaped area partition 24 in each rectangular area of the rectangular frame 21. In this case, since the lower ends of the concave portions of each corrugated plate 40 come into contact not only with the filler stones 30 filled in the block frame 20, but also with the area partition 24 that is fixed, the transverse cross section of each corrugated plate 40, which has a corrugated shape, may form a more complete truss structure.

With the truss structure of each corrugated plate 40 described above, each corrugated plate 40 may be subjected to external tensile force and compressive force, but may not be bent, thereby realizing a considerably increased bending strength. Accordingly, even when a vehicle is placed on or passes over the synthetic resin block according to the present embodiment, the synthetic resin block may maintain the original form thereof, thereby being capable of preventing car accidents due to deformation of or damage to the synthetic resin block. In the case where the cover for the block frame 20 takes the form of a flat plate, rather than the corrugated plate 40 described above, the cover for the block frame 20 may be greatly bent or damaged when a vehicle is placed on or passes over the synthetic resin block.

The drain holes 401 are formed in valleys of the concave portions of each corrugated plate 40 in the longitudinal direction of each valley. Thereby, rainwater that falls onto each corrugated plate 40 is introduced into the drain holes 401 along "V"-shaped slopes on the upper surface of the corrugated plate 40. Assuming that the upper surface of the block for roads is flat, even if holes for discharging rainwater are formed in the block for roads, the rainwater that falls onto the block for roads may collide with and bounce from the flat upper surface of the block for roads, thereby having a risk of wetting the clothes of pedestrians or flowing out of the block for roads due to the inclination of the flat upper surface of the block for roads.

On the other hand, even if the rainwater that falls onto each corrugated plate 40 collides with the upper surface of the corrugated plate 40, most of the rainwater is trapped between the "V"-shaped slopes on the upper surface of the corrugated plate 40, which considerably reduces the bouncing of the rainwater. In addition, as the rainwater flows into the drain holes 401 along the "V"-shaped slopes on the upper surface of each corrugated plate 40, the amount of rainwater that flows out of the synthetic resin block is greatly reduced. In this way, the inconvenience of pedestrians due to the bouncing of rainwater that falls onto the block for roads may be reduced, and slippage accidents of cars or pedestrians due to the formation of a water film on the road surface or around the road may be prevented.

As described above, the corrugated plates 40 are arranged so that corrugations thereof are oriented perpendicular to each other. Assuming that corrugations of the synthetic resin block are elongated in a given direction, the pedestrian or the car may slip along corrugations. According to the present embodiment, when corrugations of the synthetic resin block are alternately oriented in the longitudinal direction and in the transverse direction, the length of corrugations of the synthetic resin block that are continuously formed in a given direction may be reduced to the maximum extent, which may prevent slippage due to corrugations on the upper surface of the synthetic resin block.

As described above, among two neighboring rectangular areas of the block frame 20, any one rectangular area is configured such that, among four sidewalls thereof, two sidewalls that are opposite each other in the longitudinal direction respectively have corrugated upper ends so as to be engaged with the corrugated lower surface of each corrugated plate 40 and any one of the remaining two sidewalls that are opposite each other in the transverse direction has a flat upper end. With the shape of the upper ends in any one rectangular area of the block frame 20, any one of two neighboring corrugated plates, among the corrugated plates 40, is engaged with the upper ends of the two sidewalls that are opposite each other in the longitudinal direction of the corresponding rectangular area so that corrugations thereof are oriented in the transverse direction, thereby covering the corresponding rectangular area.

As described above, among the two neighboring rectangular areas of the block frame 20, the other rectangular area is configured such that, among four sidewalls thereof, two sidewalls that are opposite each other in the transverse direction respectively have the corrugated upper ends so as to be engaged with the corrugated lower surface of each corrugated plate 40 and any one of the remaining two sidewalls that are opposite each other in the longitudinal direction has a flat upper end. With the shape of the upper ends in the other rectangular area of the block frame 20, the other one of the two neighboring corrugated plates, among the corrugated plates 40, is engaged with the upper ends of the two sidewalls that are opposite each other in the transverse direction of the corresponding rectangular area so that corrugations thereof are oriented in the longitudinal direction, thereby covering the corresponding rectangular area.

In this way, the two neighboring corrugated plates are alternately arranged in the longitudinal direction and the transverse direction so as to be engaged with the upper ends of the two side walls of each rectangular area of the block frame 20, which may prevent slippage due to corrugations on the upper surface of the synthetic resin block and may prevent the movement of each corrugated plate 40 due to contact with, for example, vehicles or pedestrians. When the cover of the block frame 20 takes the form of a flat plate, rather than taking the form of the corrugated plate 40 described above, and thus may not be engaged with the block frame 20, the cover of the block frame 20 may move due to contact with, for example, vehicles or pedestrians that pass over the block frame 20. As a result, the filler stones 30 inside the block frame 20 may be exposed to thereby become lost or damaged. In the present embodiment, by preventing the movement of each corrugated plate 40 due to contact with, for example, vehicles and pedestrians, the synthetic resin block may continuously maintain consistent performance without being affected by contact with, for example, vehicles and pedestrians.

In addition, since a portion of the upper end of each rectangular area of the block frame 20 has a flat shape, when the corrugated plate 40 is placed over any rectangular area of the block frame 20 so as not to be engaged with the upper end of the corresponding rectangular area, the corrugated plate 40 may move around, rather than being fixed. As such, when a worker assembles each corrugated plate 40 so as to be engaged with the upper end of each rectangular area of the block frame 20, corrugations of the synthetic resin block are inevitably alternately arranged in the longitudinal direction and in the transverse direction, which may prevent corrugations of the synthetic resin block from being continuously elongated in a given direction due to a worker's mistake. Since road paving construction using the block for roads is performed over a considerably long length for a long time, even if the worker is careful, a worker's mistake inevitably occurs. The present embodiment may completely prevent the occurrence of such a worker's mistake. As a result, the synthetic resin block may continuously maintain consistent anti-slippage performance.

According to the embodiment illustrated in FIGS. 2 and 3, with the shape of the upper end of the upper right-hand rectangular area of the block frame 20, among the four corrugated plates 40, the upper right-hand corrugated plate is engaged with the upper ends of the two side walls that are opposite each other in the longitudinal direction, among the four sidewalls of the upper right-hand rectangular area of the block frame 20, so that corrugations thereof are oriented in the transverse direction, thereby covering the upper right-hand rectangular area. With the shape of the upper end of the upper left-hand rectangular area of the block frame 20, among the four corrugated plates 40, the upper left-hand corrugated plate is engaged with the upper ends of the two side walls that are opposite each other in the transverse direction, among the four sidewalls of the upper left-hand rectangular area of the block frame 20, so that corrugations thereof are oriented in the longitudinal direction, thereby covering the upper left-hand rectangular area.

With the shape of the upper end of the lower left-hand rectangular area of the block frame 20, among the four corrugated plates 40, the lower left-hand corrugated plate is engaged with the upper ends of the two side walls that are opposite each other in the longitudinal direction, among the four sidewalls of the lower left-hand rectangular area of the block frame 20, so that corrugations thereof are oriented in the transverse direction, thereby covering the lower left-hand rectangular area. With the shape of the upper end of the lower right-hand rectangular area of the block frame 20, among the four corrugated plates 40, the lower right-hand corrugated plate is engaged with the upper ends of the two side walls that are opposite each other in the transverse direction, among the four sidewalls of the lower right-hand rectangular area of the block frame 20, so that corrugations thereof are oriented in the longitudinal direction, thereby covering the lower right-hand rectangular area.

Figure 4:
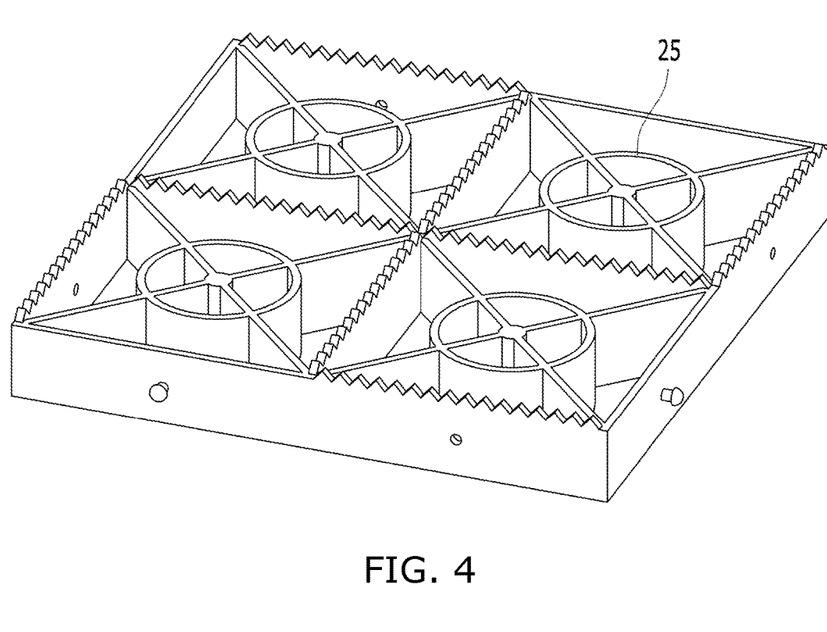
FIG. 4 is a perspective view illustrating a block frame 20 according to another embodiment of the present invention.

FIG. 4 is a perspective view illustrating the block frame 20 according to another embodiment of the present invention. Referring to FIG. 4, the block frame 20 is a synthetic resin body in which a rectangular frame 21 having open top and bottom sides, at least one linear longitudinal partition 22, which divides the inner space of the rectangular frame 21 in the longitudinal direction, at least one linear transverse partition 23, which divides the inner space of the rectangular frame 21 in the transverse direction, a plurality of "X"-shaped area partitions 24, each of which divides each rectangular area of the rectangular frame 21 into "X"-shaped areas, and a plurality of circular reinforcement partitions 25, each of which delimits a circular area in each rectangular area of the rectangular frame 21, are integrally formed with one another.

According to the embodiment illustrated in FIG. 4, since the lower ends of a plurality of concave portions of each corrugated plate 40 come into contact not only with the filler stones 30 filled inside the block frame 20 and the area partition 24, but also with the reinforcement partition 25 that is fixed, the corrugated transverse cross section of the corrugated plate 40 may form a more complete truss structure. Thereby, the strength of the block frame 20 may be increased and the bending strength of each corrugated plate 40 may be further increased. It may be understood by those skilled in the art that, in addition to the reinforcement partitions 25 described above, any other shape of partitions may be added or provided as reinforcement.

Figure 5A:
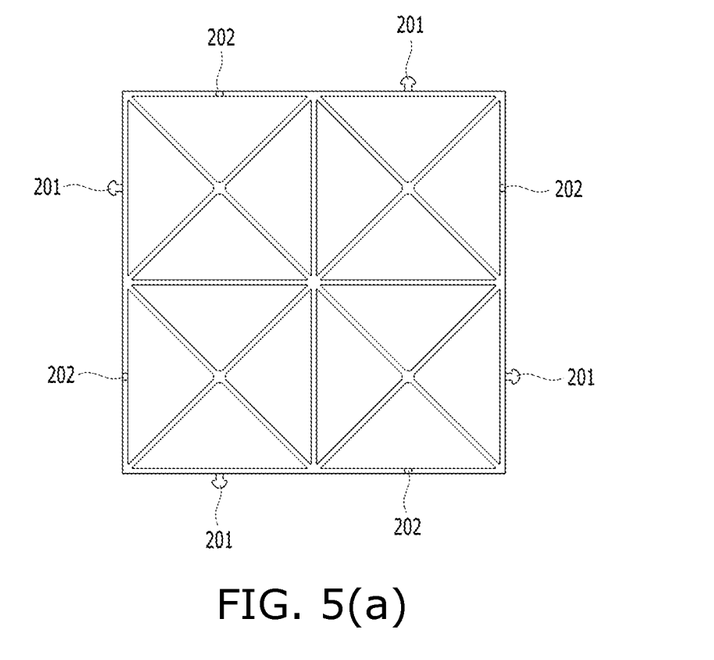
FIGS. 5(a) and 5(b) are plan views of the block frame 20 illustrated in FIGS. 1 to 4.
Figure 5B:
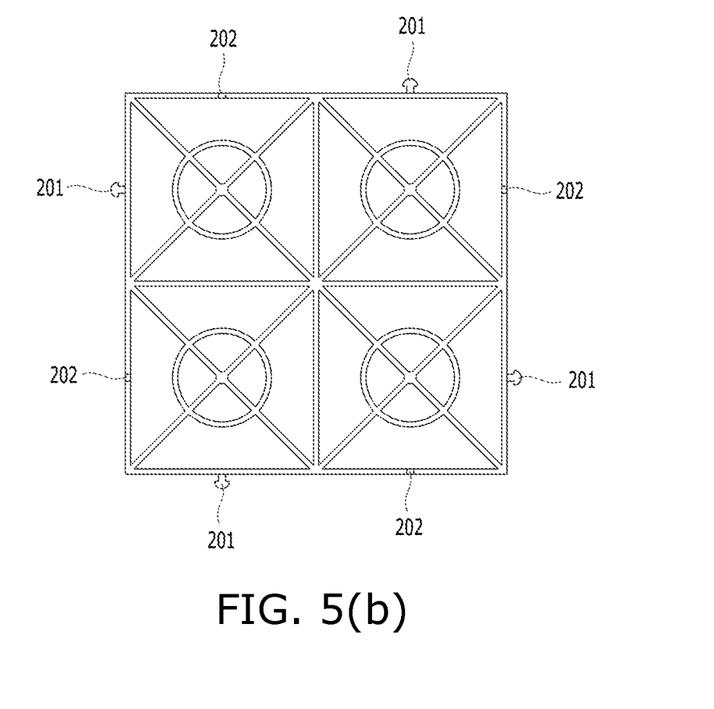

FIGS. 5(a) and 5(b) are plan views of the block frame 20 illustrated in FIGS. 1 to 4. FIG. 5(a) is a plan view of the block frame 20 illustrated in FIGS. 1 to 3(b), and FIG. 5(b) is a plan view of the block frame 20 illustrated in FIG. 4. The block frame 20 illustrated in FIGS. 5(a) and 5(b) is a synthetic resin body taking the form of the rectangular frame 21, which is divided by one longitudinal partition 22 and one transverse partition 23 so as to have four rectangular areas each having open top and bottom sides. Referring to FIGS. 1 to 5(b), the upper end of each of four sidewalls of the rectangular frame 21 is provided with a pair including a corrugated portion and a flat portion so that a plurality of pairs of corrugated and flat portions are alternately repeated in the clockwise direction or in the counterclockwise direction along the upper end periphery of the rectangular frame 21. Each of four outer surfaces of the rectangular frame 21 is provided with a pair including a protrusion 201 and a retention hole 202 so that a plurality of pairs of protrusions 201 and retention holes 202 are alternately repeated in the clockwise direction or in the counterclockwise direction along the periphery of the rectangular frame 21 so as to be caught by and coupled with each other.

Figure 6:
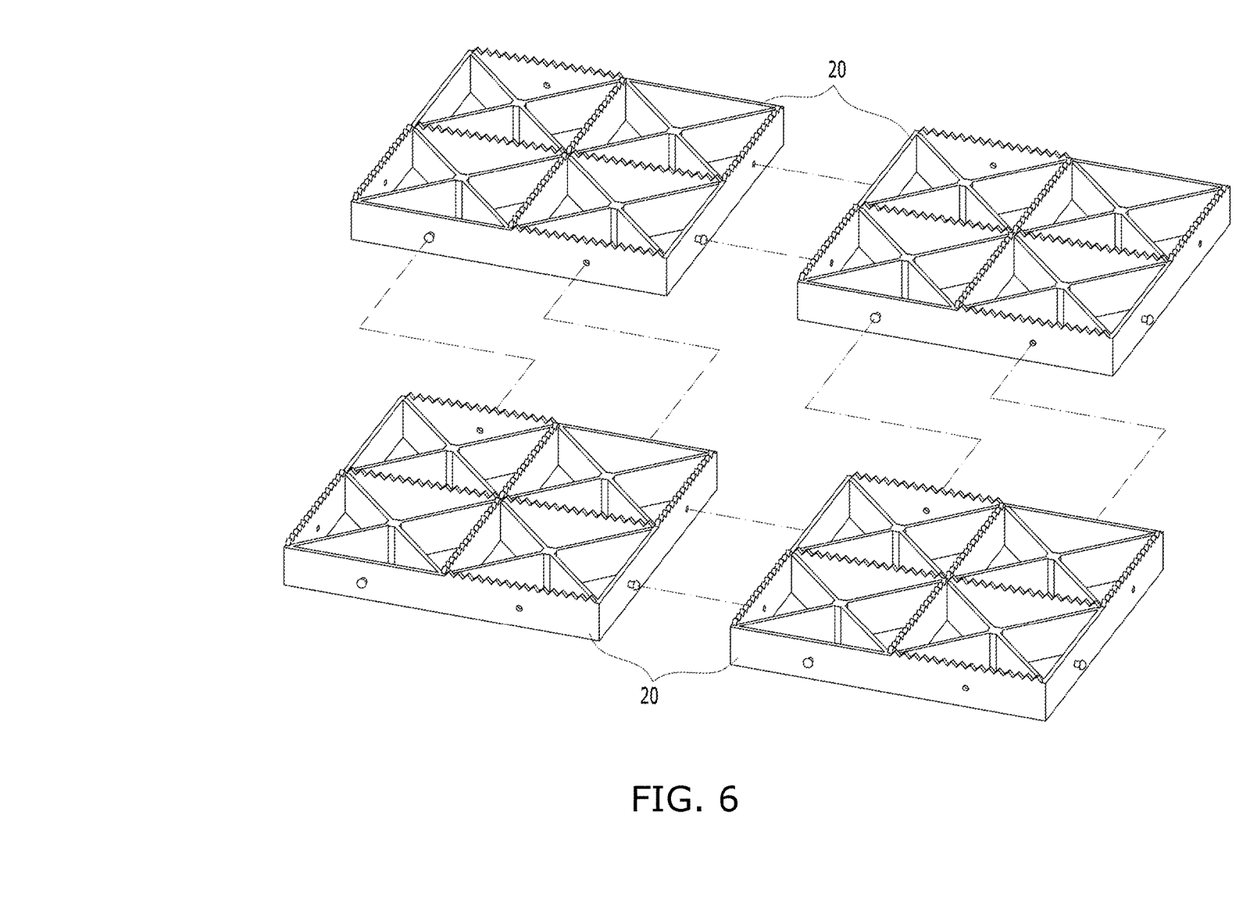
FIG. 6 is a view illustrating the connected state of a plurality of block frames 20 having the form illustrated in FIGS. 1 to 3(b)

FIG. 6 is a view illustrating the connected state of a plurality of block frames 20 having the form illustrated in FIGS. 1 to 3(b). With the coupling structure of the block frame 20 described above, as illustrated in FIGS. 1 to 5(b), the outer surface of the block frame 20 below the corrugated upper end is provided with the retention hole 202, and the outer surface of the block frame 20 below the flat upper end is provided with the protrusion 201. Alternatively, the outer surface of the block frame 20 below the flat upper end may be provided with the retention hole 202, and the outer surface of the block frame 20 below the corrugated upper end may be provided with the protrusion 201.

In this way, one pair including the protrusion 201 and the retention hole 202 on one outer surface of any one block frame 20 is caught by and coupled with one pair including the protrusion 201 and the retention hole 202 on one outer surface of another block frame 20, which has the same shape as the block frame 20. Thereby, when one block frame 20 and another block frame 20 are connected to each other, two corrugated plates 40, which cover the neighboring rectangular areas of the one block frame 20 and the other block frame 20, are configured such that corrugations thereof are oriented perpendicular to each other. When several synthetic resin blocks are connected to each other such that corrugations of the neighboring synthetic resin blocks are interconnected so as to be elongated in a given direction, there is a risk of pedestrians or vehicles slipping on corrugations. According to the present embodiment, when a worker interconnects several block frames 20, corrugations of the neighboring synthetic resin blocks are inevitably alternately arranged in the longitudinal direction and in the transverse direction, which may prevent corrugations of the synthetic resin blocks from being continuously elongated in a given direction due to a worker's mistake. As a result, even if several synthetic resin blocks are interconnected, the synthetic resin blocks may continuously maintain consistent anti-slippage performance.

For example, one pair including the protrusion 201 and the retention hole 202 on the left surface of the block frame 20 is caught by and coupled with one pair including the protrusion 201 and the retention hole 202 on the right surface of another block frame 20, which has the same shape as the block frame 20. Thereby, when one block frame 20 and another block frame 20 are connected to each other, two corrugated plates 40, which cover the two left-hand rectangular areas of the one block frame 20 and the other block frame 20, are configured such that corrugations thereof are oriented perpendicular to each other. In the same manner, one pair including the protrusion 201 and the retention hole 202 on the upper surface of the block frame 20 is caught by and coupled with one pair including the protrusion 201 and the retention hole 202 on the lower surface of another block frame 20, which has the same shape as the block frame 20. Thereby, when one block frame 20 and another block frame 20 are connected to each other, two corrugated plates 40, which cover the two upper rectangular areas of the one block frame 20, and two corrugated plates 40, which cover the two lower rectangular areas of the other block frame 20, are configured such that corrugations thereof are oriented perpendicular to each other.

Figure 7A:
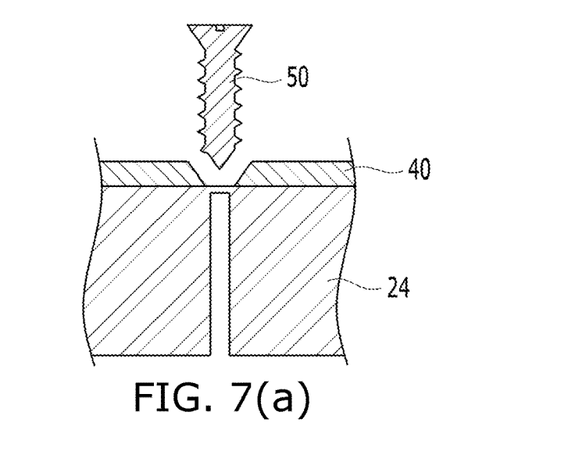
FIGS. 7(a)-7(c) are views illustrating the process of coupling a corrugated plate 40 to the block frame 20 illustrated in FIGS. 1 to 3(b).
Figure 7B:
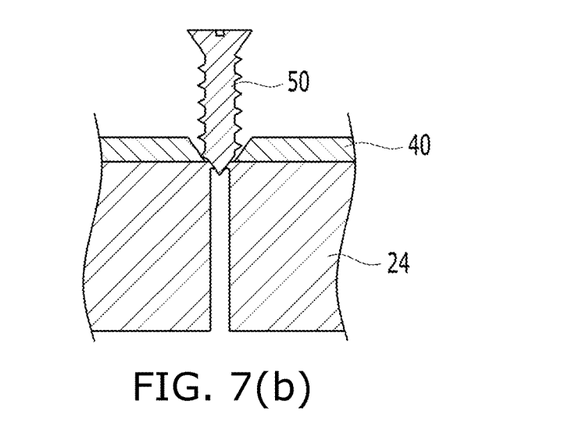
Figure 7C:
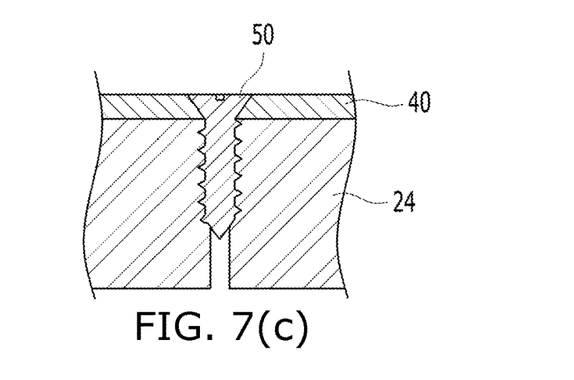

FIGS. 7(a)-7(c) are views illustrating the process of coupling the corrugated plate 40 to the block frame 20 illustrated in FIGS. 1 to 3(b). Each of the screws 50 passes through a screw hole 402 in a corresponding corrugated plate 40 and is tightened into and coupled to the center wall body of the "X"-shaped area partition 24 in each rectangular area of the rectangular frame 21, so as to couple the corrugated plate 40 to the area partition 24 of the rectangular area. Since each corrugated plate 40 is engaged with the upper ends of two sidewalls of the rectangular area of the block frame 20 when covering the corresponding rectangular area, with the tightening and coupling of the screw 50 described above, the corrugated plate 40 may be very firmly fixed and coupled to the block frame 20.

As illustrated in FIGS. 7(a)-7(c), the center wall body of the area partition 24 is provided with a vertical passage, the top of which is closed by a film that is thinner than each corrugated plate 40. As such, when a worker pushes each screw 50 so as to penetrate the film on the top of the center wall body of the area partition 24, the screw 50 is tightened with screw-threads formed in the vertical passage in the area partition 24 to thereby be coupled thereto. As described above, since each rectangular area of the block frame 20 is filled with the filler stones 30 by pouring a pile of the filler stones into the block frame 20, small grains generated in the process of crushing natural stones may fall into the block frame 20 when the filler stones 30 are poured into the block frame 20. When the vertical passage in the area partition 24 has no top film, the grains may be introduced into the vertical passage, which may prevent the screw 50 from being smoothly coupled to the vertical passage. The structure of the center wall body of the area partition 24 described above may prevent the introduction of small grains, thereby allowing the screw 50 to be smoothly coupled to the vertical passage.

As described above, the synthetic resin block according to the present embodiment may provide almost all functions required in blocks for roads such as, for example, a rainwater retention function, a water permeation function, and an anti-slippage function, may have sufficient strength to withstand the weight of vehicles, and may be manufactured in an environmentally friendly manner at low cost because the filler stones 30 constitute the great majority of the synthetic resin block. In addition, the synthetic resin block according to the present embodiment has very excellent corrosion resistance and abrasion resistance, and consequently, a greatly extended lifespan, compared to conventional cement blocks, because the entire portion thereof that is outwardly exposed is manufactured using a synthetic resin material. Since only the corrugated plate 40 is mainly worn by contact with, for example, vehicles, the synthetic resin block may continuously maintain consistent performance via the replacement of only the corrugated plate, and may ensure easy maintenance/repair work with low maintenance/repair work costs.

As is apparent from the above description, in a multi-functional synthetic resin block for roads, a plurality of rectangular areas of a block frame is filled with a plurality of filler stones having irregular shapes and a plurality of corrugated plates covers the respective rectangular areas. With this configuration, the block for roads, which has a water retention function for considerably alleviating the discomfort of pedestrians caused by an increase in the temperature of the road surface and preventing an urban heat island phenomenon and an excellent water permeation function without substantially any effect by the amount of rainfall and nonpoint pollutants on the road surface, may be provided at very low cost. In addition, the block for roads may be resistant to freezing and melting in the winter, and may continuously maintain consistent performance thereof.

Each of the corrugated plates is a synthetic resin body that takes the form of a rectangular plate having a transverse cross section in which "V"-shaped convex and concave portions are successively and alternately repeated, and is installed to come into contact with the filler stones filled in the block frame so as to form a truss structure, thereby achieving a considerably increased bending strength. Thereby, even when a vehicle is placed on or passes over the synthetic resin block according to the present invention, the synthetic resin block may maintain the original form thereof, thereby being capable of preventing car accidents due to deformation of or damage to the synthetic resin block.

Even if rainwater that falls onto each corrugated plate collides with the upper surface of the corrugated plate, most of the rainwater is trapped between the "V"-shaped slopes on the upper surface of the corrugated plate, which considerably reduces the bouncing of the rainwater. In addition, as the rainwater flows into drain holes along the "V"-shaped slopes on the upper surface of each corrugated plate, the amount of rainwater that flows out of the synthetic resin block is greatly reduced. In this way, the inconvenience of pedestrians due to the bouncing of rainwater that falls onto the block for roads may be reduced, and slippage accidents of cars or pedestrians due to the formation of a water film on the road surface or around the road may be prevented. In addition, the corrugated plates are arranged such that corrugations thereof are oriented perpendicular to each other, slippage due to corrugations on the upper surface of the synthetic resin block may be prevented.

The synthetic resin block according to the present invention may provide almost all functions required in blocks for roads such as, for example, a rainwater retention function, a water permeation function, and an anti-slippage function, may have sufficient strength to withstand the weight of vehicles, and may be manufactured in an environmentally friendly manner at low cost because the filler stones constitute the great majority of the synthetic resin block. In addition, the synthetic resin block according to the present invention has very excellent corrosion resistance and abrasion resistance, and consequently, a greatly extended lifespan, compared to conventional cement blocks, because the entire portion thereof that is outwardly exposed is manufactured using a synthetic resin material. Since only the corrugated plates are mainly worn by contact with, for example, vehicles, the synthetic resin block may continuously maintain consistent performance via the replacement of only the corrugated plates, and may ensure easy maintenance/repair work with low maintenance/repair work costs.

Two neighboring corrugated plates are alternately arranged in the longitudinal direction and the transverse direction so as to be engaged with the upper ends of two side walls of each rectangular area of the block frame. Thereby, it is possible to prevent slippage due to corrugations on the upper surface of the synthetic resin block and to prevent the movement of each corrugated plate due to contact with, for example, vehicles or pedestrians. As a result, the synthetic resin block may continuously maintain consistent performance without being affected by contact with, for example, vehicles and pedestrians. In addition, since it is possible to prevent corrugations of the synthetic resin block from being continuously elongated in a given direction due to a worker's mistake, the synthetic resin block may continuously maintain consistent anti-slippage performance.

One pair including a protrusion and a retention hole on one outer surface of any one block frame is caught by and coupled with one pair including the protrusion and the retention hole on one outer surface of another block frame, which has the same shape as the block frame. Thereby, when one block frame and another block frame are connected to each other, two corrugated plates, which cover the neighboring rectangular areas of the one block frame and the other block frame, are configured such that corrugations thereof are oriented perpendicular to each other. In this way, when a worker interconnects several block frames, corrugations of the neighboring synthetic resin blocks are inevitably alternately arranged in the longitudinal direction and in the transverse direction, which may prevent corrugations of the synthetic resin blocks from being continuously elongated in a given direction due to a worker's mistake. As a result, even if several synthetic resin blocks are interconnected, the synthetic resin blocks may continuously maintain consistent anti-slippage performance.

Each corrugated plate covers each rectangular area of the rectangular frame so as to be seated on the upper end of the "X"-shaped area partition in each rectangular area of the rectangular frame. In this case, since the lower ends of the concave portions of each corrugated plate come into contact not only with the filler stones filled in the block frame, but also with an area partition that is fixed, the transverse cross section of each corrugated plate, which has a corrugated shape, may form a more complete truss structure. As a result, the synthetic resin block according to the present invention may achieve a considerably increased bending strength.

In the area partition, the center wall body thereof is provided with a vertical passage, the top of which is closed by a film that is thinner than each corrugated plate. As such, when a screw penetrates the film on the top of the center wall body, the screw is tightened with screw-threads formed in the vertical passage in the area partition to thereby be coupled thereto. Thereby, even if small grains generated in the process of crushing natural stones fall into the block frame when the filler stones are poured into the block frame, it is possible to prevent the grains from being introduced into the vertical passage, which may allow the screw to be smoothly coupled to the vertical passage.

Although exemplary embodiments of the present invention have been described for illustrative purposes, those skilled in the art will appreciate that various modifications, additions, and substitutions are possible, without departing from the scope and spirit of the present invention. Hence, the disclosed embodiments should be considered in terms of explanation, rather than being in terms of limitation. The scope of the present invention is defined in the claims, rather than by the above description, and all differences that fall within the equivalent range of the claims should be construed as being included in the present invention.

| *Description of Reference Numerals* | |
|---|---|
| 10: water permeable sheet | 20: block frame |
| 21: rectangular frame | 22: longitudinal partition |
| 23: transverse partition | 24: area partition |
| 25: reinforcement partition | |
| 201: protrusion | 202: retention hole |
| 30: filler stone | 40: corrugated plate |
| 401: drain hole | 402: screw hole |
| 50: screw | |

What is claimed is:

1. A multifunctional synthetic resin block for roads, comprising:
    a water permeable sheet configured as a synthetic resin block taking a form of a flat sheet to enable permeation of water through pores in a predetermined pattern, the water permeable sheet being laid on a ground;
    a block frame configured as a synthetic resin body taking a form of a rectangular frame, which is divided by at least one longitudinal partition and at least one transverse partition so as to have a plurality of rectangular areas each having open top and bottom sides, the block frame being installed on an upper surface of the water permeable sheet;

a plurality of filler stones having irregular shapes so that each filler stone has a larger particle size than a size of any pore in the water permeable sheet, the rectangular areas of the block frame being filled with the filler stones; and a plurality of corrugated plates each configured as a synthetic resin body taking a form of a rectangular plate having a transverse cross section in which "V"-shaped convex and concave portions are successively and alternately repeated, the corrugated plates being arranged so that corrugations thereof are oriented perpendicular to each other, thereby covering the respective rectangular areas of the block frame, which are filled with the filler stones, wherein lower ends of the concave portions of each corrugated plate come into contact with the filler stones filled in the block frame so that the corrugated transverse cross section of the corrugated plate forms a truss structure in which triangular frameworks are successively arranged in a single plane, wherein, among four sidewalls of each rectangular area of the block frame, three sidewalls have corrugated upper ends and a remaining sidewall has a flat upper end, whereby the corrugated plates are arranged so that corrugations thereof are oriented perpendicular to each other when each corrugated plate is placed over a corresponding rectangular area of the block frame so as to be engaged with an upper end of the corresponding rectangular area, and whereby each corrugated plate is not fixed when the corrugated plate is placed over a corresponding rectangular area of the block frame so as not to be engaged with an upper end of the corresponding rectangular area, wherein each corrugated plate has a plurality of drain holes formed in respective valleys of the concave portions thereof in a longitudinal direction of the valleys so that rainwater that falls onto the corrugated plate is introduced into the drain holes along "V"-shaped slopes on an upper surface of the corrugated plate, and wherein some of the rainwater that has passed through the drain holes in each corrugated plate is stored in a void that has a closed bottom side, among voids between the filler stones, and the remaining rainwater passes through a void that has open top and bottom sides, among the voids between the filler stones, and the water permeable sheet to thereby be discharged into the ground.

2. The synthetic resin block according to claim 1, wherein one of two neighboring corrugated plates, among the corrugated plates, is engaged with upper ends of two sidewalls that are opposite each other in a longitudinal direction of one rectangular area among two neighboring rectangular areas of the block frame so that corrugations thereof are oriented in a transverse direction, thereby covering the corresponding rectangular area, and wherein a remaining one of the two neighboring corrugated plates is engaged with upper ends of two sidewalls that are opposite each other in a transverse direction of a remaining rectangular area among the two neighboring rectangular areas so that corrugations thereof are oriented in the longitudinal direction, thereby covering the remaining rectangular area.

3. The synthetic resin block according to claim 2, wherein, among four sidewalls of the one rectangular area, the two sidewalls that are opposite each other in the longitudinal direction have the corrugated upper ends so as to be engaged with a corrugated lower surface of the corresponding corrugated plate and one of two sidewalls that are opposite each other in the transverse direction has a flat upper end, whereby the corrugated plate is engaged with the upper ends of the two sidewalls that are opposite each other in the longitudinal direction of the corresponding rectangular area so that corrugations thereof are oriented in the transverse direction, thereby covering the corresponding rectangular area, and wherein, among four sidewalls of the remaining rectangular area, the two sidewalls that are opposite each other in the transverse direction have the corrugated upper ends so as to be engaged with a corrugated lower surface of the corresponding corrugated plate and one of two sidewalls that are opposite each other in the longitudinal direction has a flat upper end, whereby the remaining corrugated plate is engaged with the upper ends of the two sidewalls that are opposite each other in the transverse direction of the corresponding rectangular area, thereby covering the corresponding rectangular area.

4. The synthetic resin block according to claim 3, wherein the block frame is a synthetic resin body taking a form of a rectangular frame, which is divided by one longitudinal partition and one transverse partition so as to have four rectangular areas each having open top and bottom sides, wherein an upper end of each of four sidewalls of the rectangular frame is provided with a pair including a corrugated portion and a flat portion so that pairs of corrugated and flat portions are alternately repeated in a clockwise direction or in a counterclockwise direction along an upper end periphery of the rectangular frame, wherein each of four outer surfaces of the rectangular frame is provided with a pair including a protrusion and a retention hole so that pairs of protrusions and retention holes are alternately repeated in the clockwise direction or in the counterclockwise direction along an outer periphery of the rectangular frame so as to be caught by and coupled with each other, and wherein one pair including the protrusion and the retention hole on one outer surface of the block frame is caught by and coupled with one pair including the protrusion and the retention hole on one outer surface of another block frame, which has the same shape as the block frame, whereby, when the block frame and the other block frame are connected to each other, two corrugated plates, which cover neighboring rectangular areas of the block frame and the other block frame, are configured such that corrugations thereof are oriented perpendicular to each other.

5. The synthetic resin block according to claim 1, wherein the block frame includes a rectangular frame having open top and bottom sides, a linear longitudinal partition configured to divide an inner space of the rectangular frame in a longitudinal direction, a linear transverse partition configured to divide the inner space of the rectangular frame in a transverse direction, and a plurality of "X"-shaped area partitions each configured to divide a corresponding rectangular area of the rectangular frame into "X"-shaped areas, and wherein each corrugated plate covers a corresponding rectangular area of the rectangular frame so as to be seated on an upper end of a corresponding "X"-shaped area partition in the corresponding rectangular area of the rectangular frame.

6. The synthetic resin block according to claim 5, further comprising a plurality of screws, each of which passes through a screw hole in a corresponding corrugated plate and is tightened into and coupled to a center wall body of a corresponding "X"-shaped area partition in a corresponding rectangular area of the rectangular frame, so as to couple the corrugated plate to the "X"-shaped area partition in the rectangular area of the rectangular frame,     wherein the center wall body of the "X"-shaped area partition is provided with a vertical passage, a top of which is closed by a film that is thinner than a corresponding corrugated plate, and     wherein each screw is pushed to penetrate the film on the top of the center wall body, and thereafter is tightened with screw-threads formed in the vertical passage to thereby be coupled thereto.

\* \* \* \* \*